(12) United States Patent
Westergaard

(10) Patent No.: US 12,152,564 B2
(45) Date of Patent: Nov. 26, 2024

(54) FLUID FLOW ENERGY EXTRACTION SYSTEM AND METHOD RELATED THERETO

(71) Applicant: TEXAS TECH UNIVERSITY SYSTEM, Lubbock, TX (US)

(72) Inventor: Carsten Hein Westergaard, Houston, TX (US)

(73) Assignee: Texas Tech University System, Lubbock, TX (US)

( * ) Notice: Subject to any disclaimer, the term of this patent is extended or adjusted under 35 U.S.C. 154(b) by 167 days.

(21) Appl. No.: 17/473,574

(22) Filed: Sep. 13, 2021

(65) Prior Publication Data

US 2022/0074384 A1 Mar. 10, 2022

Related U.S. Application Data

(63) Continuation of application No. 15/515,985, filed as application No. PCT/US2015/053002 on Sep. 29, 2015, now Pat. No. 11,118,564.

(Continued)

(51) Int. Cl.
*F03D 3/04* (2006.01)
*F03B 13/10* (2006.01)
(Continued)

(52) U.S. Cl.
CPC ............... *F03D 3/04* (2013.01); *F03B 13/10* (2013.01); *F03D 1/04* (2013.01); *F03D 9/20* (2016.05);
(Continued)

(58) Field of Classification Search
CPC ... F03D 3/04; F03D 13/10; F03D 1/04; F03D 9/20; F03D 9/25; F03D 9/28; F03D 9/34;
(Continued)

(56) References Cited

U.S. PATENT DOCUMENTS 2,485,543 A 10/1949 Andreau
2,488,467 A 11/1949 De Lisio
(Continued)

FOREIGN PATENT DOCUMENTS

EP 1586770 A1 10/2005
JP S56167897 A 12/1981
(Continued)

OTHER PUBLICATIONS

Delafond, F., "Problems Concerning Automatic Connection of an Aerogenerator to a Network (translation)", Original: United Nations Conference on New Sources of Energy, 1961, Proceedings Solar Energy, Wind Power and Geothermal Energy, Rome, Aug. 21-31, 1961; vol. 7, Wind Power, pp. 390-394, Translation: National Aeronautics and Space Administration, NASA TT F14,873, Washington, D.C. 20546, Apr. 1973.

(Continued)

*Primary Examiner* — Aaron R Eastman
(74) *Attorney, Agent, or Firm* — Dickinson Wright PLLC; Kristopher Lance Anderson

(57) ABSTRACT

Disclosed is a system and method for both consumer and utility scale energy extraction from flow-based energy sources. The passive system may utilize directing perforations on a surface in order to create and air jet vortex generators. Alternatively the system may provide for flow through discrete orifices aligned with the span of an aerodynamic assembly in a co-flow direction, utilizing a Coanda effect. Further additional configurations include directing flow through a perforated surface skin that is near the trailing edge on the suction side. Even further are embodiments for blowing air directly out of the trailing edge of an airfoil. The disclosed systems and methods support a wide variety of scenarios for fluid flow energy extraction, such as wind or water flow, as well as for related products and services.

21 Claims, 16 Drawing Sheets

Related U.S. Application Data

(60) Provisional application No. 62/057,325, filed on Sep. 30, 2014.

(51) Int. Cl.
  *F03D 1/04*   (2006.01)
  *F03D 9/20*   (2016.01)
  *F03D 9/25*   (2016.01)
  *F03D 9/28*   (2016.01)
  *F03D 9/34*   (2016.01)

(52) U.S. Cl.
  CPC .............. *F03D 9/25* (2016.05); *F03D 9/28* (2016.05); *F03D 9/34* (2016.05); *F05B 2240/133* (2013.01); *F05B 2240/9112* (2013.01); *Y02B 10/30* (2013.01); *Y02E 10/728* (2013.01); *Y02E 10/74* (2013.01)

(58) Field of Classification Search
  CPC ....... F05B 2240/133; F05B 2240/9112; Y02B 10/30; Y02E 10/728; Y02E 10/74; Y02E 10/72; Y02E 10/20
  See application file for complete search history.

(56) References Cited

U.S. PATENT DOCUMENTS

| | | | |
|---|---|---|---|
| 2,784,556 A | 3/1957 | Perdue | |
| 6,437,457 B2 | 8/2002 | Roskey | |
| 7,918,650 B2 | 4/2011 | Papp | |
| 8,177,479 B2 | 5/2012 | Watts | |
| 9,194,361 B2 | 11/2015 | Roberts | |
| 9,567,856 B2 | 2/2017 | Faller | |
| 11,047,360 B1* | 6/2021 | Houchens | F03D 3/005 |
| 11,118,564 B2* | 9/2021 | Westergaard | F03D 3/04 |
| 2005/0099011 A1 | 5/2005 | Rochester et al. | |
| 2008/0181771 A1 | 7/2008 | Papp | |
| 2010/0034642 A1* | 2/2010 | Evulet | F03D 9/32 290/55 |
| 2011/0011072 A1 | 1/2011 | Watts | |
| 2011/0042959 A1 | 2/2011 | Kelly | |
| 2013/0099502 A1 | 4/2013 | Roberts | |
| 2013/0216356 A1 | 8/2013 | Faller | |
| 2017/0298900 A1 | 10/2017 | Westergaard | |
| 2022/0074384 A1 | 3/2022 | Westergaard | |
| 2022/0250763 A1* | 8/2022 | Abron | B64D 41/00 |
| 2023/0061818 A1* | 3/2023 | Westergaard | F03D 3/005 |
| 2023/0184206 A1* | 6/2023 | Battisti | F03B 17/063 416/223 R |
| 2023/0184215 A1* | 6/2023 | Sala Lluma | H02J 3/381 320/101 |
| 2023/0193873 A1* | 6/2023 | Jensen | F03D 9/25 416/179 |

FOREIGN PATENT DOCUMENTS

| | | |
|---|---|---|
| JP | S57206778 A | 12/1982 |
| WO | 2001025629 A1 | 4/2001 |
| WO | 2009030881 A1 | 3/2009 |
| WO | 2012001317 A1 | 1/2012 |
| WO | 2016054080 A1 | 4/2016 |

OTHER PUBLICATIONS

Djairam, D., "The Electrostatic Wind Energy Converter: Electrical performance of a high voltage prototype" 2008; https://repository.tudelft.nl/islandora/object/uuid%3Ae1cfdada-85ea-45c4-b6e4-b798abf5917e?collection=research.

Gammack, P., "Dyson fan: why it is a 'novel invention'" The Telegraph, 2009; http://www.telegraph.co.uk/technology/6389354/Dyson-fan-why-it-is-a-novel-invention.html.

Gipe, P., Wind-works.org; http://www.wind-works.org/cms/index.php?id=709.

Hutter, U., "Past Developments of Large Wind Generators in Europe", University of Stuttgart, approximately 1968.

Keen, E., "A Conceptual Design Methodology for Predicting the Aerodynamics of Upper Surface Blowing on Airfoils and Wings", Thesis, Virginia Polytechnic Institute & State University, Nov. 2004.

Oliver, A. et al., "Wind turbine blades equipped with Air-jet vortex generators: Full scale verification of blades optimised for increased performance", EWEC, Dublin, Oct. 1997.

Price, T., "UK Large-Scale Wind Power Programme From 1970 to 1990:The Carmarthen Bay Experiments and the Musgrove Vertical-Axis Turbines", Wind Engineering, vol. 30, No. 3, 2006.

Wallop, H., "Dyson fan: was it invented 30 years ago?" The Telegraph, 2009; https://www.telegraph.co.uk/technology/news/6377644/Dyson-fan-was-it-invented-30-years-ago.html.

International Preliminary Report on Patentability for PCT/US2015/053002 dated Apr. 4, 2017, 6 pages.

International Search Report and Written Opinion for PCT/US2015/053002 dated Apr. 7, 2017, 9 pages.

\* cited by examiner

FIG. 7A-B

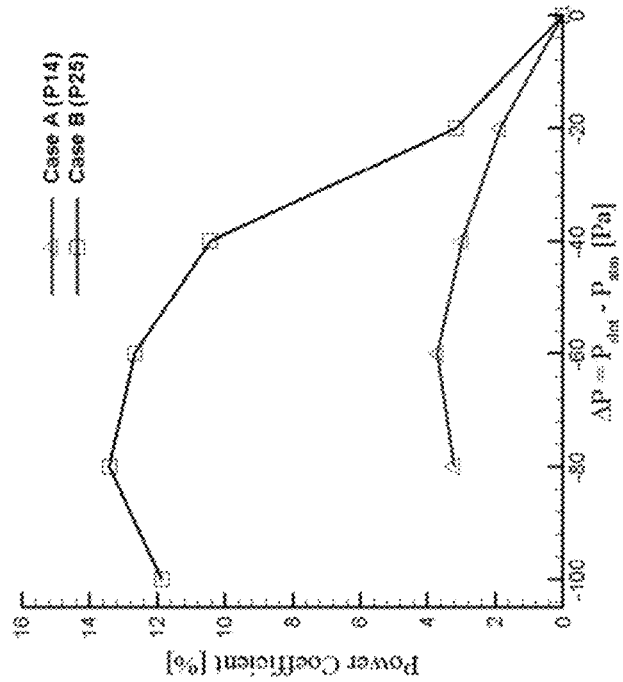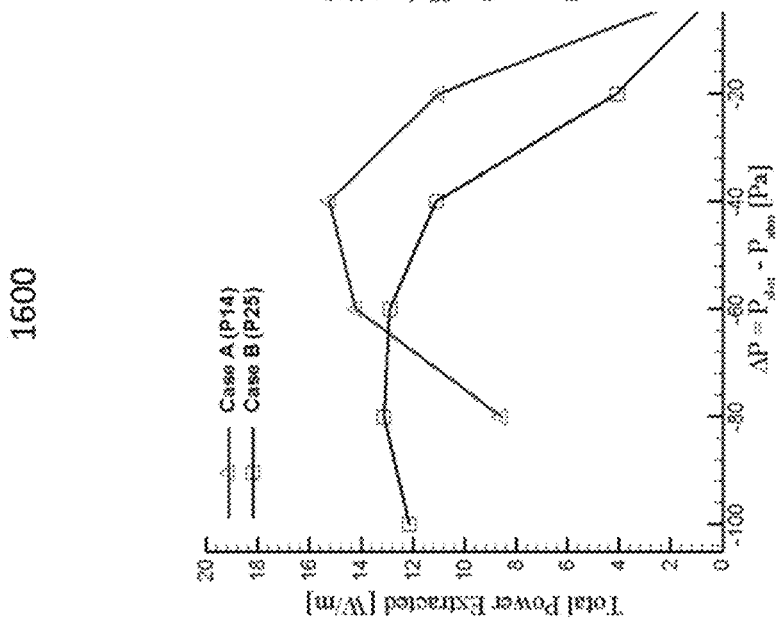
FIG. 16A-B

FLUID FLOW ENERGY EXTRACTION SYSTEM AND METHOD RELATED THERETO

CROSS-REFERENCE TO RELATED APPLICATIONS

This application is a continuation application of and claims priority and benefit to U.S. patent application Ser. No. 15/515,985 filed on Mar. 30, 2017, which is the § 371 national phase filing of PCT/US2015/053002, filed on Sep. 29, 2015, entitled "Fluid Flow Energy Extraction System and Method Related Thereto" which claims priority to provisional U.S. Patent Application Ser. No. 62/057,325, filed on Sep. 30, 2014, entitled "Fluid Flow Energy Extraction Systems and Methods Related Thereto" which such applications are commonly assigned to the Assignee of the present invention and which disclosures are hereby incorporated herein by reference in their entirety for all purposes.

This application includes material that is subject to copyright protection. The copyright owner has no objection to the facsimile reproduction by anyone of the patent disclosure, as it appears in the World Intellectual Property Office or United States Patent and Trademark Office files or records, but otherwise reserves all copyright rights whatsoever.

TECHNICAL FIELD

The present invention relates in general to the field of energy extraction. In particular, the system provides for both consumer and utility scale energy extraction from flow-based energy sources. The disclosed systems and methods support a wide variety of scenarios for fluid flow energy extraction, such as wind or water flow, as well as for related products and services.

STATEMENT OF FEDERALLY FUNDED RESEARCH

None.

BACKGROUND OF THE DISCLOSURE

Wind energy, the process by which wind is exploited to generate electrical power, has shown tremendous promise. Wind energy systems do not produce greenhouse gas emissions during production and do not consume any water for cooling. This, coupled with the fact that, in some locations, the "cost of electricity from wind is comparable to that from conventional fossil-fueled power plants" makes wind a provider of clean energy at an economic price. However, the large mass of machinery required in wind energy systems results in a high cost of materials. Also, the placement of the machinery at such a height results in tedious and expensive maintenance. Additionally, the noise pollution, potential wildlife threat, land mass use, and lack of aesthetic appeal associated with wind energy systems can be unfavorable.

Conventional wind energy systems deploy rather larger masses of machinery high up in the air on tall towers in order to extract wind power efficiently using large rotor blades. This adds weight to the top of the system and imposes a relatively high materials usage in the machinery, tower and foundation. Furthermore, the large rotors are fragile systems, which need to be made from high performance composites. Their rotation can have a number of unintended side effects such as interaction with wild life, throwing ice accumulation, lightning attraction and many other issues. In addition the maintenance of the system is difficult as it has to be done at height. These types of problems become more significant when turbines are installed close to population centers or directly on buildings. Conventional or unconventional water flow extraction systems (tidal, river or similar systems) in the renewable energy fields pose very similar sets of problems.

There have been efforts to address alternative, or unconventional flow-based energy extraction systems. In 1953 De Havilland Propellers Ltd. build a 100 kW wind turbine in St. Albans (Prince, 2006), UK based on the Andreau-Enfield wind turbine principle (Andreau, 1946). Later, in 1957 the Algerian Gas and Electricity Company build a similar turbine at Grand Vent (Delafond, 1961). Both turbines had a diameter of 24 meters. The Andreau-Enfield turbine is driven by a hollow wind turbine blade, in which airflow is allowed to exit the tip of the blade. The flow inside the blade is driven by the centrifugal force, essentially having the whole rotor operating a centrifugal pump. The pump draws the air from the base of the tower, where airflow passes a fan which extracts power.

The performance drawback comparing this concept to a modern day wind turbine is obviously that there are a series of losses associated with the system. Nevertheless, Ulrich Hutter reported in the late 1960's a power curve which is surprisingly good showing a system power coefficient of about 11%. Presumably, this number could be higher, had the machine been designed with modern day wind turbine technology (blades and generators), fan technology and duct design. The benefit of the design is that the power generating equipment now is placed on the ground, making the machine design lighter and allowing for ground-based servicing of the equipment. However the concept still needs to maintain systems at the top which controls the rotor blade, both in terms of power regulating the rotor and yawing the rotor to face the wind.

Another known wind technology based on ducted wind turbines, also aims to improve wind energy systems. In these systems, a shroud is used to speed up the wind in a manner very similar to the venture effect and then extract the wind energy using a small conventional rotor and generator system. Although very attractive, the concept has the same drawbacks as conventional wind turbines. Further, the structure has to carry aerodynamic loading from the shroud.

As mentioned, most of the existing wind turbine concepts involve moving blades in the swept area, whereas only few systems do not. One example is the EWICON frame, which harvests energy from the wind by electrostatic discharge being transported through a frame facing the wind. A second concept is the INVELOX system from Sheer wind, which takes air in from a conical structure, leading it into a duct where the energy is extracted by a turbine.

Inversely, the Dyson (2009) and Tokyo Shibaura Electric (1981) air fans systems are both developed to accelerate ambient air through a ring shaped structure in a household setting. A variant over the concept is found in De Lisio Salvatore's (1949) invention where multiple rings are used. Other variants of these systems can be found medical venturi masks, industrial dilution blowers with air entrainment, industrial air movers and many other applications.

Despite efforts to create more efficient and reliable flow energy extraction systems, there are currently no commercially successful approaches which limit many of the inherent risks and drawbacks of the traditional turbine design. It is therefore a need in the art to develop high performance flow energy extraction systems capable of both consumer and utility-scale energy generation.

SUMMARY OF THE DISCLOSURE

The present invention addresses the limitations of the art by providing the generation of a high pressure potential of a passive structure. This can be generated with high lift aerodynamic assemblies, such as airfoils. It is well known from the aerospace industry that high lift can be achieved by blowing air through the surface. Such ideas have been demonstrated in wind energy, where blowing through the skin of a conventional wind turbine rotor was used to enhance performance.

The present invention provides a solution to all the aforementioned detriments in the form of a fluid flow energy extraction system that has no external rotor blades. The system is composed of a self-amplifying aerodynamic system, and may further comprise one or more airfoils. This aerodynamic system extracts the wind energy and is connected to a turbine wheel at the bottom of the system which is in turn connected to a generator.

The fundamental approach of the present invention is to maximize on the generation of high pressure potential in a passive structure. This is achieved through the use of aerodynamic assemblies. One example of an aerodynamic assembly is an airfoil. The airfoil is a blade with a span placed in a wind flow. The airfoil is angled to the wind; this orientation creates a low suction pressure on its suction side. A series of orifices, or perforations, are placed along the span of the blade. The orifices are placed in a deliberative, calculating manner to maximize the efficiency of the airfoil performance. There are many embodiments for the placement of the orifices: they can be placed in a cross-flow configuration, co-flow configuration, or they can be altogether replaced with a slit or series of slits.

It is therefore an object of the present invention to increase pressure potential by angling the orifices to the surface normal in order to create a small vortex. This is known as an air jet vortex generator. It is another object of the present invention to blow the air through discrete orifices or through a slit aligned with the span of the blade in a co-flow direction of the airfoil. This is used in some aircrafts where high lift is needed, often referred to as the Coanda effect.

It is another object of the present invention to provide a system for energy extraction from a fluid comprising at least one aerodynamic assembly having a plenum, wherein the aerodynamic assembly further comprises one or more perforations on its outer surface; an energy extraction device comprising an inlet and an outlet; and a channel providing fluid connection between the outlet of the energy extraction device and the aerodynamic assembly plenum; wherein fluid flow across the aerodynamic assembly causes a negative inner aerodynamic assembly plenum pressure (Pi) relative to an ambient pressure (Pa) resulting in fluid flow through the energy extraction device, into the plenum and out through the perforations of the aerodynamic assembly due to the pressure differential, Pi–Pa.

The aerodynamic assembly may further comprise one or more airfoils arranged to generate low pressure regions near the perforations. An energy extraction device is connected to an electric generator or hydraulic pump, which may further comprise more than one of an electric generator or hydraulic pump. The fluid flow may be water or air. Further, the system may comprise a motor to align the device or parts of the device in response to the direction of the fluid flow.

In another aspect, the one or more perforations on the aerodynamic assembly is arranged to amplify the differential pressure (Pi–Pa) as additional fluid exits the perforations in the surface. Further two or more aerodynamic assemblies are mirrored to increase centerline pressure and airflow velocity to higher than ambient conditions. The surfaces may further be arranged in a ring shaped configuration.

It is another object of the present invention to provide a converter electrically coupled to the generator and configured to convert AC voltage received from the generator to DC voltage. One or more additional features may be provided, including comprising at least one aerodynamic assembly is mounted onto a building structure or mounting the generator at a level below the roof of the building structure and in fluid communication to the plenum of the at least one aerodynamic assembly by the channel.

It is another object of the present invention to provide at least one aerodynamic assembly mounted underwater. Further, the energy extraction device of the underwater system may be mounted above water and in fluid communication to the plenum of the at least one aerodynamic assembly by the channel. Thus one half of the aerodynamic assembly is the underwater bottom surface or comprises of a shape aligned with the underwater bottom.

It is another object of the present invention to provide a method of extracting energy from a fluid comprising: positioning at least one aerodynamic assembly having a plenum, wherein the aerodynamic assembly comprises one or more perforations on its outer surface, and connecting an energy extraction device comprising an inlet and an outlet using a channel in fluid connection between the outlet of the energy extraction device and the aerodynamic assembly plenum, wherein the fluid flowing across the aerodynamic assembly causes a negative plenum pressure (Pi) relative to the ambient pressure (Pa) resulting in fluid flow through the energy extraction device, into the plenum and out through the perforations of the aerodynamic assembly.

In one aspect, the method comprises one or more of the following features: the aerodynamic assembly further comprises one or more airfoils arranged to generate low pressure regions near the perforations; the energy extraction device is connected to one or more of an electric generator or hydraulic pump; a motor to align the aerodynamic assembly in response to the direction of the fluid flow; the one or more perforations on the aerodynamic assembly is arranged to amplify the Pi-Pa pressure differential; at least two aerodynamic assemblies are mirrored to increase centerline pressure and airflow velocity to higher than ambient conditions; a converter electrically coupled to the generator and configured to convert AC voltage received from the generator to DC voltage; at least one aerodynamic assembly mounted onto a building structure; the energy extraction device is mounted at a level below the roof of the building structure in fluid communication to the plenum of the at least one aerodynamic assembly by the channel; at least one aerodynamic assembly mounted underwater and wherein the energy extraction device is mounted above water and in fluid communication to the plenum of the at least one aerodynamic assembly by the channel.

There are however, other methods which can effectively produce higher airfoil performance. It is therefore another object of the present invention to provide a system for blowing through a perforated surface skin, made effective when it is near the trailing edge on the suction side. It is yet another object of the present invention to have air blowing directly out of the trailing edge of the airfoil. Indeed, the present invention allows the wind extraction to take place within the airfoils, thus removing the need for the external rotor blades. This present invention decreases noise pollution, land mass use, and wildlife threat. Additionally, the present invention effectively and economically places all the relevant heavy machinery (turbine and generator) at the ground level of the disclosed embodiments.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 16A depicts the power extracted in Watt per meter airfoil and the corresponding power coefficient calculated as a function of the pressure differential between the hollow of the airfoils and the ambient pressure.

FIG. 16B depicts a measurement of power extracted in percentage of efficiency of the airfoil and the corresponding power coefficient.

DETAILED DESCRIPTION OF THE DISCLOSURE

Figure 1:
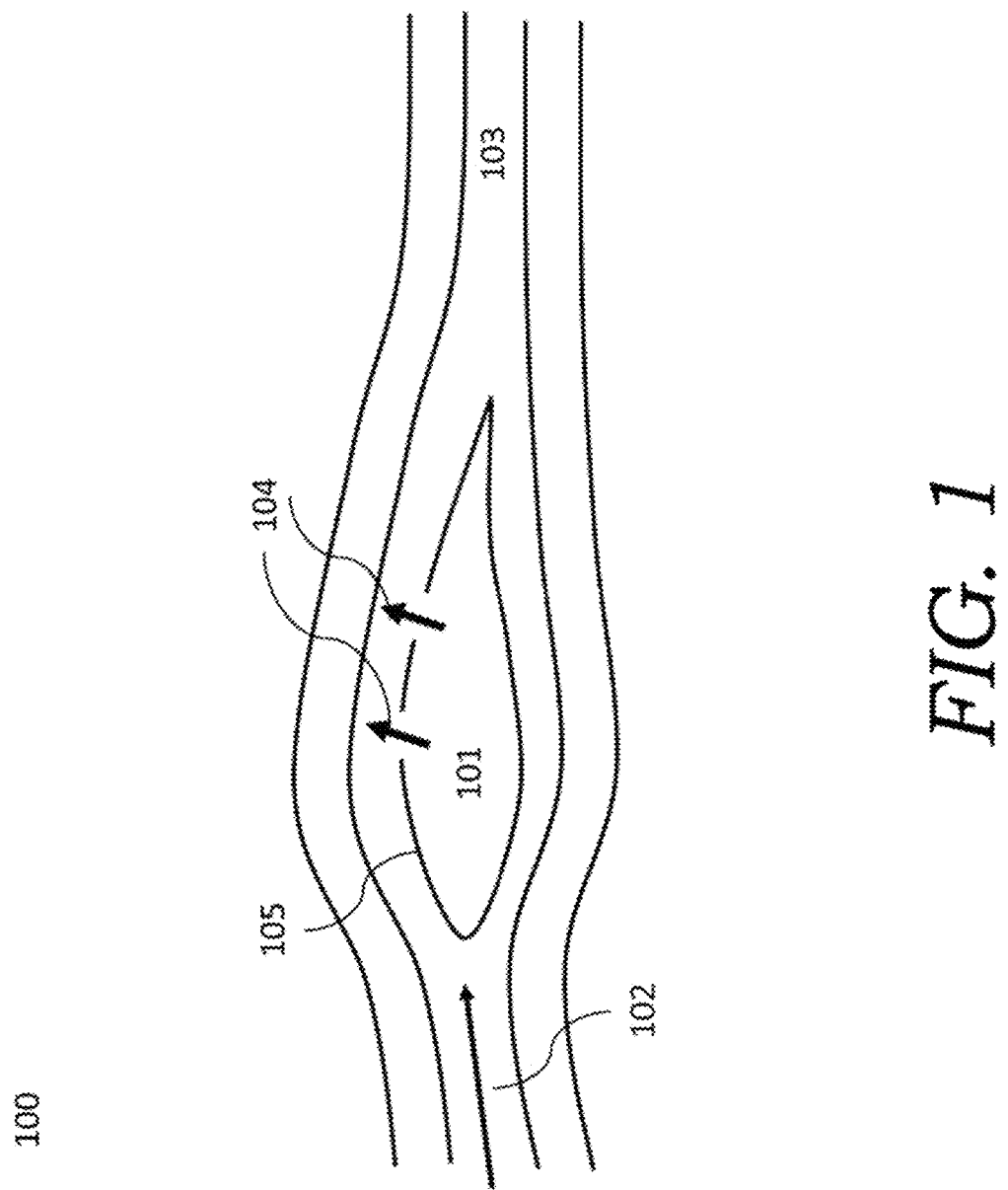
FIG. 1 depicts a diagram of a two-dimensional representation of fluid flowing around one aerodynamic assembly having a plenum.

While the making and using of various embodiments of the present invention are discussed in detail below, it should be appreciated that the present invention provides many applicable inventive concepts that can be embodied in a wide variety of specific contexts, goods, or services. The specific embodiments discussed herein are merely illustrative of specific ways to make and use the disclosure and do not delimit the scope of the disclosure.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The present invention will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present invention is described below with reference to diagrams, drawings, block diagrams and operational illustrations of methods and procedures. It is understood that each block of the block diagrams, drawings, or operational illustrations, and combinations of blocks in the block diagrams, drawings, or operational illustrations, can be implemented by means of executed steps or by hardware and computer program instructions, or by other automated means.

Figure 2:
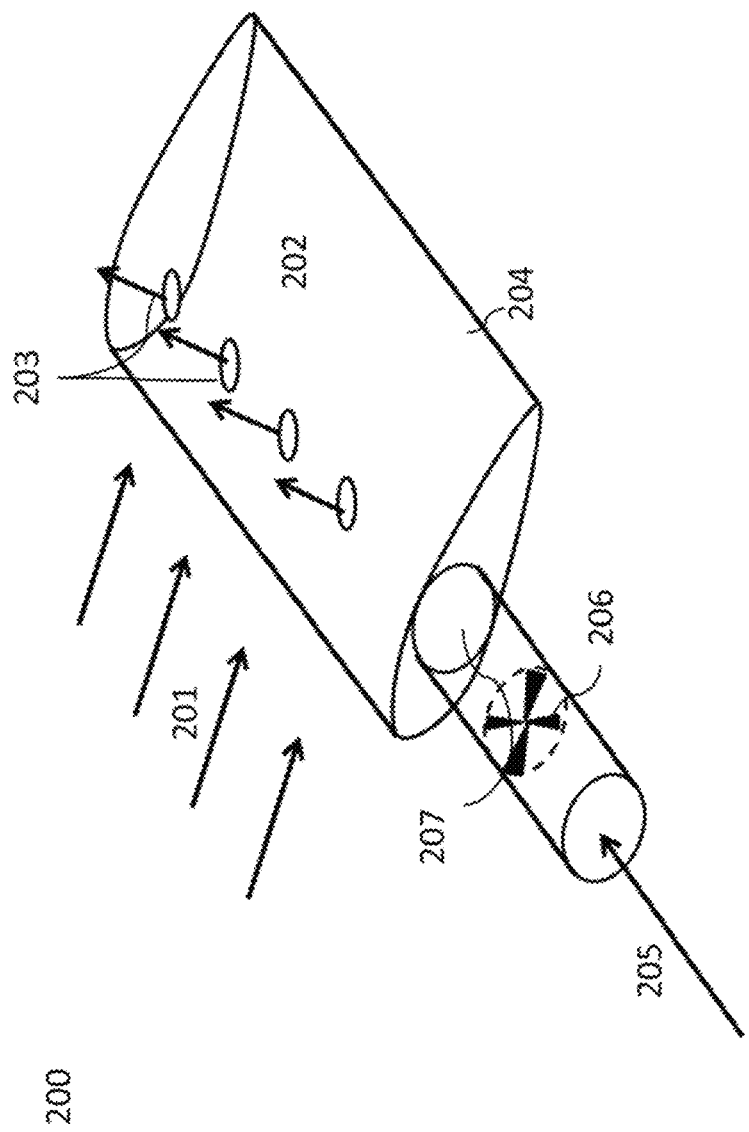
FIG. 2 depicts a diagram of a simple-form of the present invention, having one airfoil, on duct, and one energy extraction device.

The embodiments described herein may be embodied in many different forms. In its principal form, the invention comprises of one aerodynamic assembly. Turning to FIG. 1, an exemplary embodiment 100 is presented. The aerodynamic assembly 105 may be an airfoil. The airfoil 105 is further embodied to be angled to the wind to create a suction pressure on its suction side, to be described by the non-dimensional number, Cp. The pressure from the flow 102, represented as $U_\infty$, drives airflow 104, represented as $U_j$, through the skin of the surface of the aerodynamic assembly originating from one or multiple perforations of the skin of the airfoil 104, leaving a pressure inside the airfoil plenum 101, referred to as Pi. It is the plenum pressure, Pi, which is used to drive an energy extraction. The plenum 101, which refers to the inside chamber of the aerodynamic assembly, is then connected to the atmospheric, or ambient, pressure, Pa, through a channel. The principle may further be represented as $Pa+0.5*p*Cp*U_\infty^2$, In a fundamental embodiment of the present invention, an aerodynamic assembly, referred to further herein as an airfoil, with a span is placed in a wind flow. A series of orifices, or perforations, is placed along the span of the blade to allow for the beneficial flow to occur through the skin. The orifices are placed in such a way that the flow through the orifices will assist the efficiency of the airfoil performance. The configuration can be in a cross flow or co-flow configuration. It is also possible the orifices are replaced with a slit or a series of slits (Coanda type arrangement). In another embodiment the air is blown directly out of the trailing edge of the blade. In another embodiment the skin of the airfoil is perforated. As the wind passes the blade, the low pressure on the suction side drives the generation of an inner plenum pressure, Pi. Connecting the plenum via a channel to the atmospheric pressure, Pa, a flow through the channel is generated into the plenum and out through the airfoil skin. The total airflow through the channel is determined by the total volume flow through the skin:

$$Vt=\mathrm{Sum}(Aj*Uj),[1,N],$$

where Aj is the area of skin perforation and $U_j$ is the average velocity. If a fan and motor is placed in the channel, energy can be extracted from the airflow, Vt. The energy extracted is proportional to the airflow through the fan, the pressure drop over the fan, but no more than (Pa−Pi), and the efficiency of the fan. FIG. 2 shows an exemplary airfoil assembly 204 in fluid communication with the ambient pressure Pa 205. This pressure differential creates a flow through the channel 207 that is directed towards the plenum 202 and out through the orifices 203, as the direction and shape of the airfoil 204 allows for fluid flow 201 to create a pressure differential (Pa−Pi). By placing a fan, motor, and generator, collectively referred to as an electric generator 206, in the strategically-placed channel 207, which is in fluid communication with the plenum 202, energy can be extracted. In another embodiment, the channel may lead to a hydraulic pump. In yet another embodiment, the channel comprises combinations of one or more electric generators or one or more hydraulic pumps.

Figure 3:
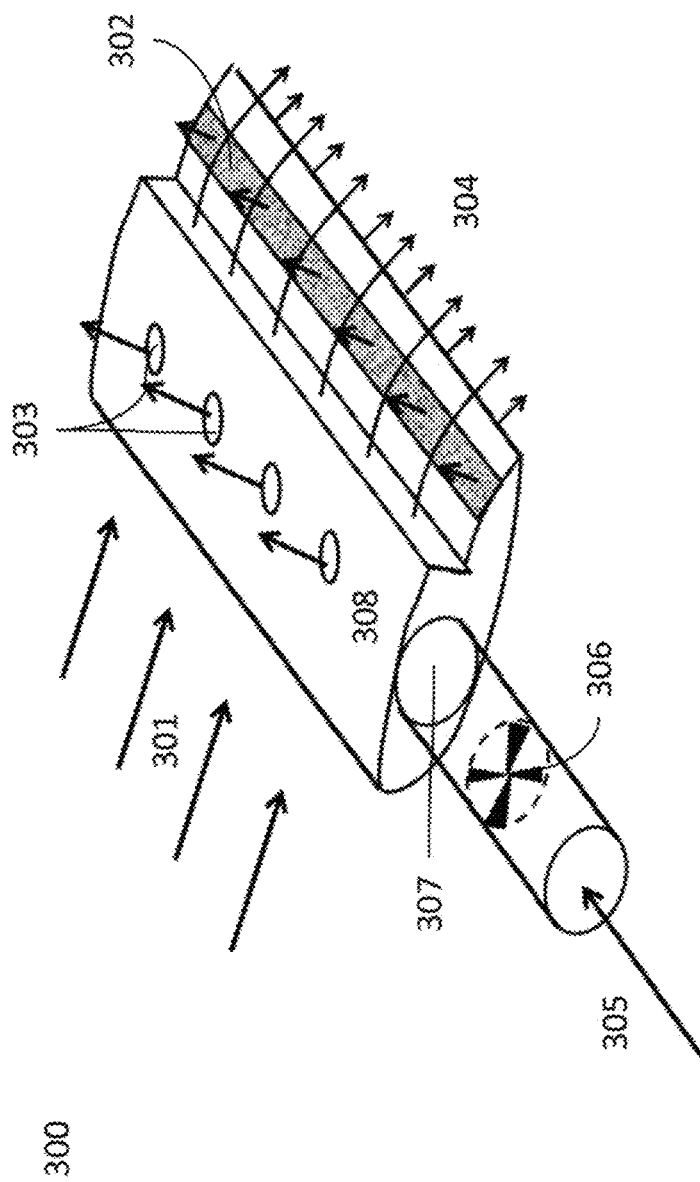
FIG. 3 depicts a schematic of a mosaic of differing skin flows and accompanying perforations or orifices.

Turning to FIG. 3, an aerodynamic device 300 describing varying alternatives of perforations 302, 303 is provided. Fluid flow 301 drives the airflow 305 into a channel 307 in fluid communication with the plenum 308. The various perforations 302, 303 have the airflow drawn through. The Pa−Pi pressure differential the airflow 305 driven through the channel 307 actuates the electric generator 306, resulting in energy extraction. A trailing edge blowing 304 may further allow for a Coanda effect to occur in connection with the skin perforation 302.

Different versions of skin flows may be desirable, as the one-airfoil configuration shown in FIGS. 2-3 may result in additional efficiency and structural issues. Although the simple form shown in FIG. 2 is possible to realize, it is noted by Oliver et al. 1997, in a wind tunnel effect during testing of a regular airfoil. The effect in their test with 35 m/s wind and an area of 0.78 m$^2$ produces less than 34 watts of effect corresponding of a power coefficient of about 1%. Considering that the objective of an aerodynamic performance of this kind enhancement normally is to minimize the flow through the skin, which in terms reduces the power and the efficiency for energy extraction. Also, it is determined to be a less efficient way of implementing the present invention, the most important reason being that it may prove difficult to realize sufficient low pressure build-up on the suction side of the airfoil with a single airfoil. Secondly, the single airfoil configuration is very sensitive to facing of the fluid flow very accurately, i.e. it needs to be in a narrow angle of attack with the wind direction, corresponding to the maximum lift and thus suction pressure.

Figure 5:
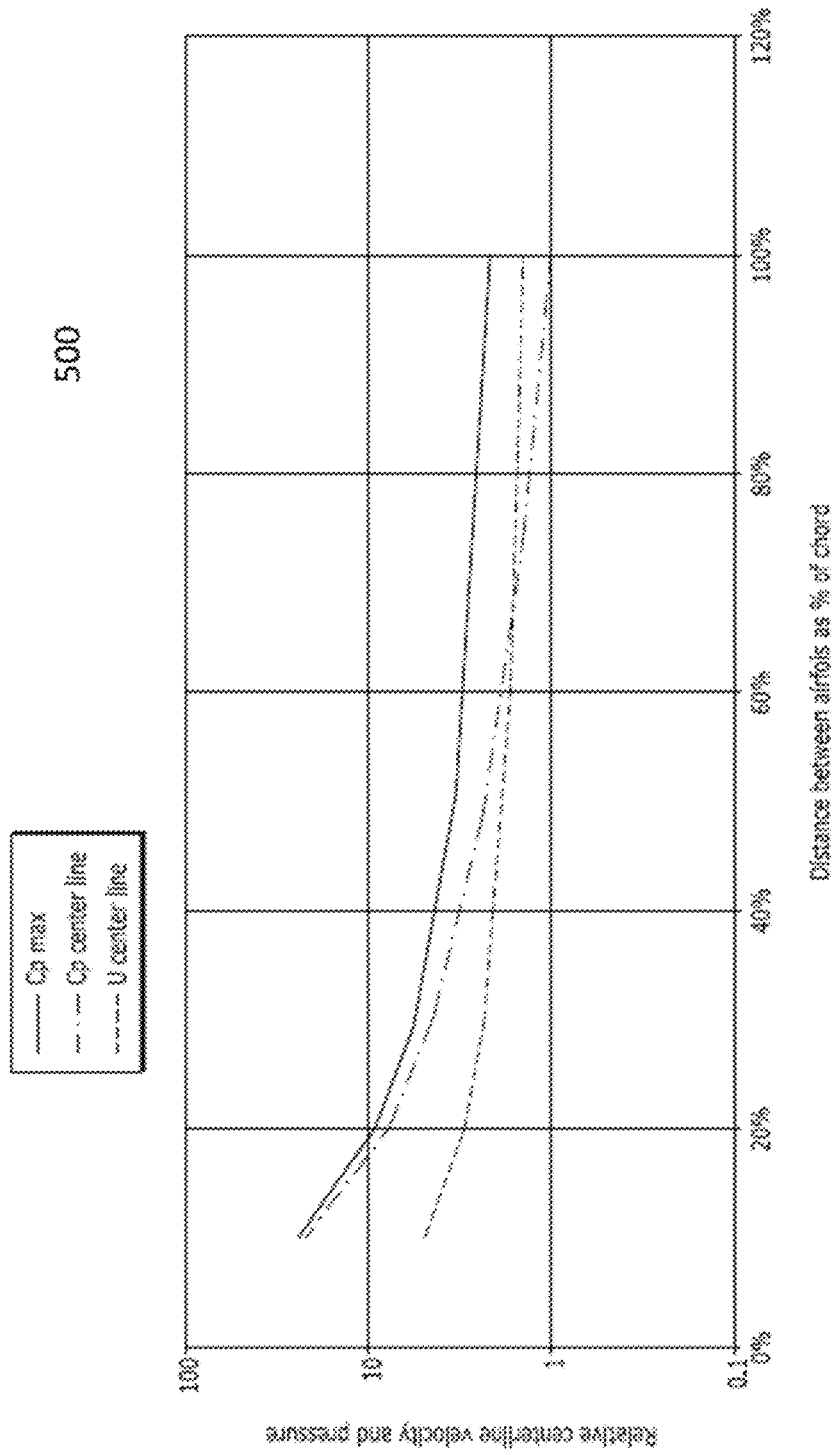
FIG. 5 depicts a chart illustrating paired airfoil performance as a function of distance.

Placing two airfoils mirrored to each other produces several additional advantages. First of all the pressure at the surface of each respective airfoil can be more than 20 times higher than it otherwise would be, before the flow breaks down and stop working due to viscous forces in the fluid, especially when placed very close together (see FIG. 5). In an exemplary embodiment, the airfoil used in FIG. 5 as an example is a NACA634XX which was made 20% thick. The large thickness was chosen to emphasize that plenty of room can be made available in the plenum for internal airflow while also offering structural advantage. Secondly the centerline pressure and airflow velocity will be significantly higher than ambient conditions even when the airfoils are not close together and the sensitivity to the wind direction is significantly reduced. Thus, it the present invention describes the overall potential of the structure to extract energy as the secondary airflow is injected from the ambient pressure. The paired set offers structural advantages, when one considers the structure sitting passively through storms and may experience side winds. A model of 2*0.015 m$^2$, would at 15 m/s be able to easily produce 14 W per meter length, corresponding to an efficiency of 20% or about 430 W/m$^2$ surface area with jets.

An important aspect of the present invention is that the flow through the skin, the surface of the aerodynamic assembly, for example by air jets, will enhance the airfoil performance. The higher the airflow, the better the airfoil performance. In principle, if the system was friction free, this is a completely self-amplifying concept. The more air flowing through the skin, the stronger the performance of the system. Compared to a shrouded or ducted wind turbine, these exhibit the same airflow acceleration, when the rotor is not engaged. However, one the rotor engages this chokes the effect of the shroud, rather than amplifying it as in the present invention.

Figure 4:
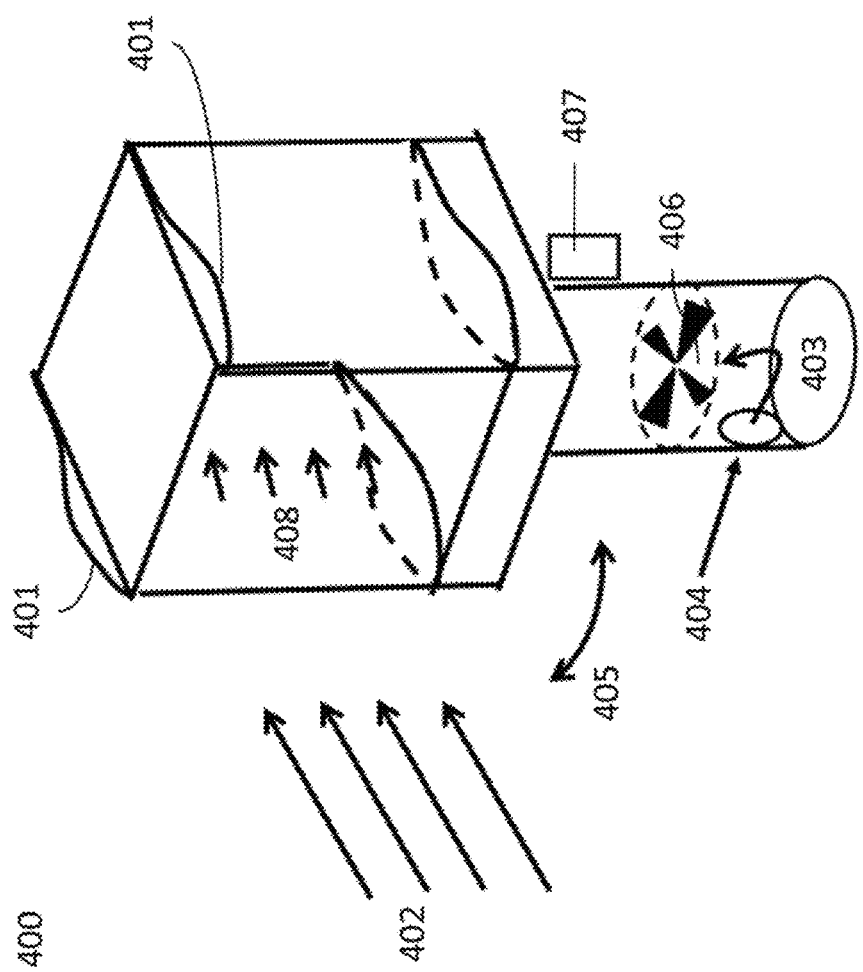
FIG. 4 depicts a schematic of two opposing, or mirrored, airfoil configurations on an axis capable of being turned into fluid flows.

FIG. 4 shows a further embodiment of the present invention to employ a two-airfoil mirrored system with a yaw motor that allows the system to rotate in response to the direction of the wind, where the ambient pressure and air intake is at the bottom of a tower, passing through the power generating fan, divides into the two opposite airfoils and into the free stream driven by the low pressure. A dual airfoil assembly 400 provides two airfoils 401 in a mirrored arrangement. The airfoils having a plenum and various perforations (not shown) in a mirror-like fashion. The fluid flow path 402 is directed in between the airfoils 408, and driven through the assembly 400. The assembly may be rotated 405 for directional alignment with the fluid flow 402. This may be accomplished by mechanical actuation such as a yaw motor 407 actuating upon an axis 403. The axis 403 may further act as the channel in fluid communication between the atmosphere 404 and the plenum of each airfoil. An electric generator 406 is placed within the channel 403. It is another embodiment of the present invention to provide two opposing airfoils that extract the wind are connected to the turbine wheel at the base, thus being self-amplifying— the stronger the airflow through the jets, the lower the pressure to drive them. Regulating the maximum power is achievable simply in this configuration by a simple actuated air choke located at any point along the flow path. This is a much simpler and safer way to regulate the power, compared to normal wind turbines which are dependent on the generator to be connected to the grid in order to maintain a safe rotor speed. The airfoil arrangement would preferably sit on a motorized arrangement that aligns the system with the incoming wind as with FIG. 4.

Figure 6:
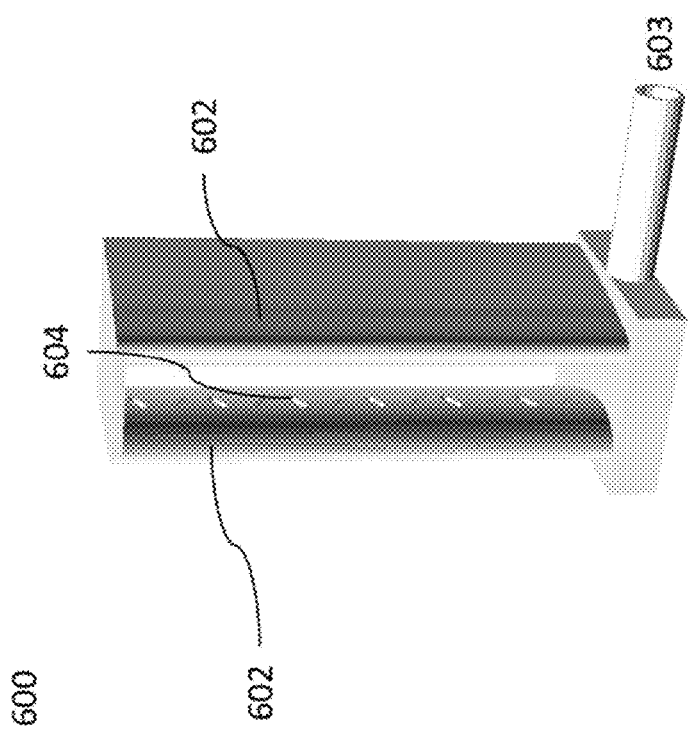
FIG. 6 depicts an embodiment with two opposing airfoils showing air jets arranged in the preferred arrangement with elongated perforations (oval or square or similar) arranged counter oriented (also having an angle to the surface normal).

FIG. 6 provides an optimized arrangement of the present invention 600, wherein optimal air jet vortex generators are utilized 604. Mirrored aerodynamic assemblies 602 are positioned to utilize the amplification characteristics described above. A machine of this size is capable of large sizes. The exemplary embodiment of FIG. 6 is 20 meters tall and a chord of 1 meter, and produces about 9 kW @ 15 m/s wind speed without any form of further design optimization.

Figure 7A:
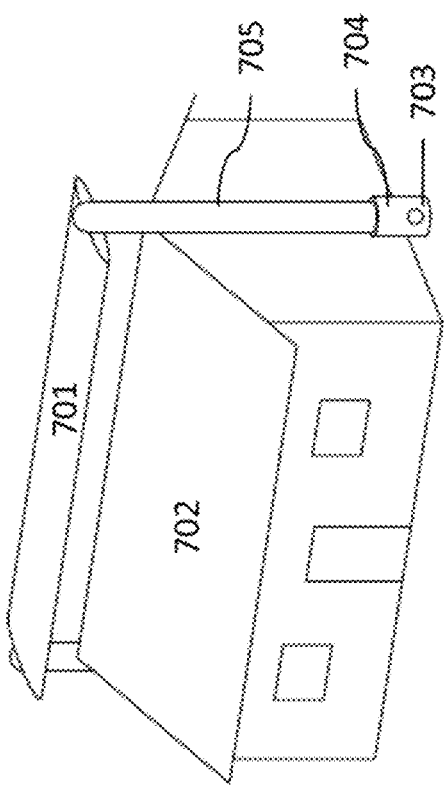
FIG. 7A depicts a simple arrangement of an aerodynamic device paired with a house roof top wherein the roof is acting as part of the opposite airfoil.
Figure 7B:
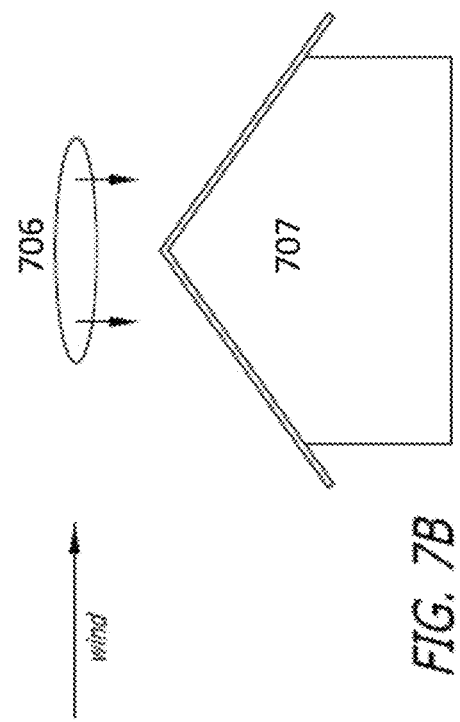
FIG. 7B depicts an elevational view of the aerodynamic system paired with a house roof top.

In another embodiment, the proposed technology can be integrated into buildings in a more aesthetically pleasing manner and can be integrated into a house roof, as show in FIG. 7. FIG. 7A shows a perspective view of a house structure having an aerodynamic assembly 701 positioned parallel to the apex of a roof 702. The roof 702 acts part of the opposite airfoil. A channel 705 provides fluid communication with an electric generator 704 having an inlet 703 and an outlet into the channel 705. Perforations in the basal portion of the aerodynamic assembly 701 cause the ambient airflow to cause a pressure differential between the plenum and roof 702. In this system 700, the airflow comes through the air intake at the bottom and out through the gap between the airfoil and the house roof. In FIG. 7, the roof acts as the opposite airfoil and the gap between the airfoil and roof corresponds to the orifices in the embodiment of FIG. 3 and the elongated slits in the embodiment of FIG. 4 and FIG. 6. The airflow comes through the air intake at ground level, passes the generator and its fan, up on top into the airfoil and out through the gap between the airfoil and the house roof. Placing the generator at ground level removes the vibration problems usually associated to wind turbines on houses. The airflow comes through the air intake 703 at ground level, passes the generator and its fan 704, up through the channel 705 on top into the airfoil 701 and out through the gap between the airfoil and the house roof 702. It is very likely that in order to optimize this application, and depending on the roof top shape, airflow would also be needed to come out of the roof top, or by pipes placed on the roof top with gaps. Placing the generator at ground level removes the vibration problems usually associated to wind turbines on houses. Specifically for this arrangement, there is a relatively large wind direction acceptance, despite the limitations of the house turning towards the wind direction. For many regions around the world, there is a prevailing wind direction, so the only requirement is that the house is arranged perpendicular to the prevailing wind direction to maintain effect.

The embodiment illustrated in FIG. 7, provides an efficient configuration for river and ocean currents, which are often uni-directional or bi-polar in direction, where the house is replaced with a bottom mounted structure. One preferred solution is to continue to utilize a pair set of airfoils, i.e. FIG. 6 turned 90 degrees and parallel with the bottom mounted with a tripod in each end. For a 20 meter long device, the energy extraction would be about 360 kW at a current of 3 m/s.

Figure 8:
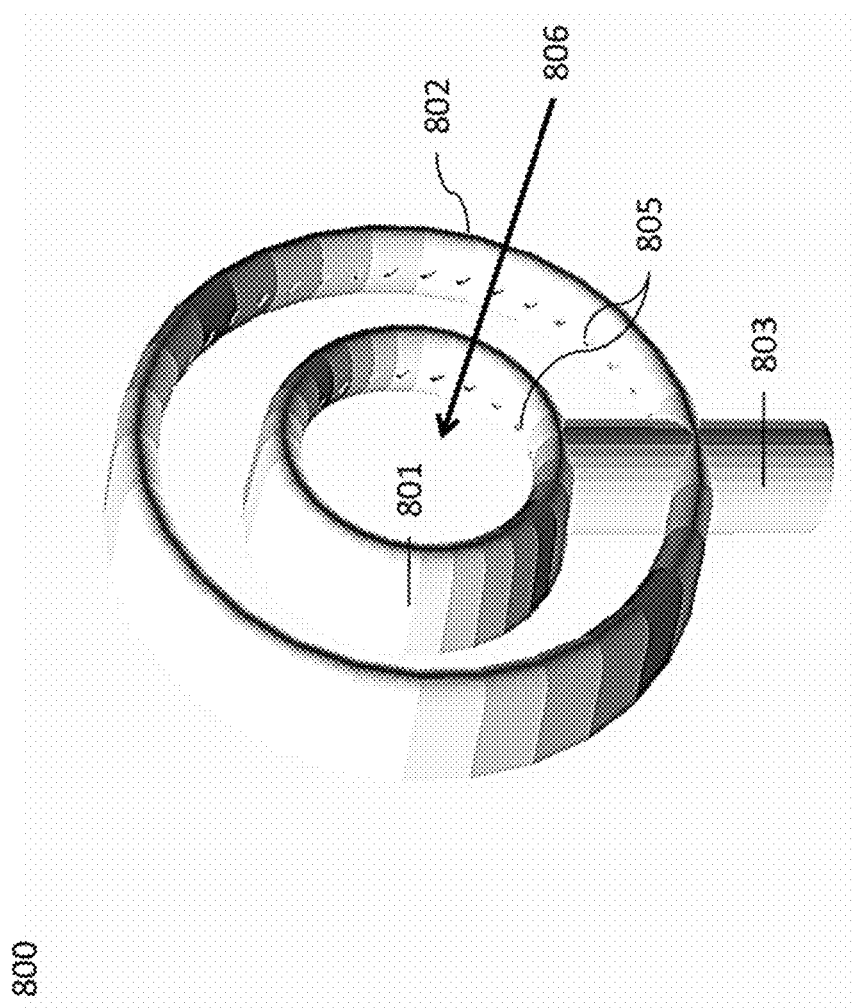
FIG. 8 depicts a ring arrangement of the present invention. Air jets are shown only with one swirl direction.

FIG. 8 constitutes a ring arrangement of the present invention. Here the airfoils are not placed opposite, i.e. suction side against suction side such as in FIG. 6 and FIG. 7, but rather in tandem as a classic pair of flapped airfoils. Also in this embodiment the airfoils are not paired as they are in the two opposite airfoil case (FIG. 6), as this concept takes further advantages of amplifying the wake expansion by displacing as much as possible tangentially after passing the turbine. The airfoils 801, 802 are able to utilize the presence of the inner ring, in the case of the outer ring 802, or the opposing ends of the ring arrangement, in the case of the inner ring 801, for amplification effect. Perforations 805 are thus located on the inside (suction) side of each airfoil 801, 802. Fluid flow 806 passes through the assembly, which draw from the channel 803 into the plenum of each ringed airfoil 801, 802 activating the electric generator (not shown) in the channel 803.

Figure 9:
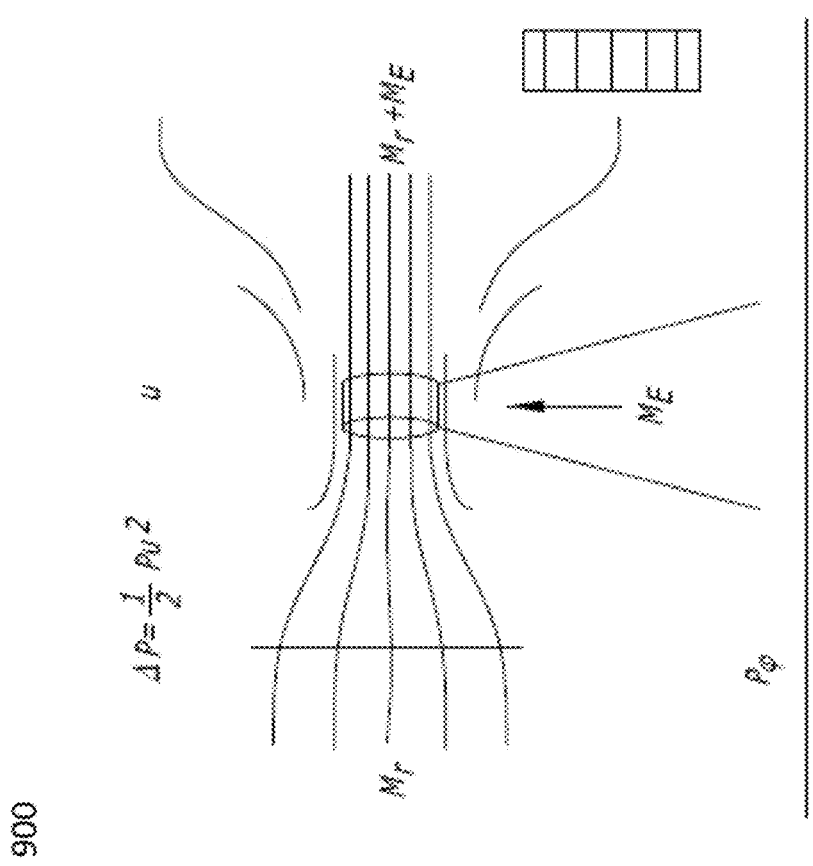
FIG. 9 depicts a cross sectional view showing air intake at the base of a tower.

FIG. 9 constitutes a simpler variant of the embodiment shown in FIG. 8, wherein a tower continues into the middle of the inner ring and air is being ejected in the middle of the inner ring. The outer ring amplifies the wake expansion, which produces the under-pressure driving the machine. The airfoils do not have an inner flow and in principle can be a plat or sail type airfoil. In this embodiment, air intake is shown at the base of the tower, represented as ME. The tower continues into the middle of the inner ring and air is being ejected in the middle of the inner ring. The outer ring amplifies the wake expansion, which produces the under-pressure driving the energy extraction.

Figure 10:
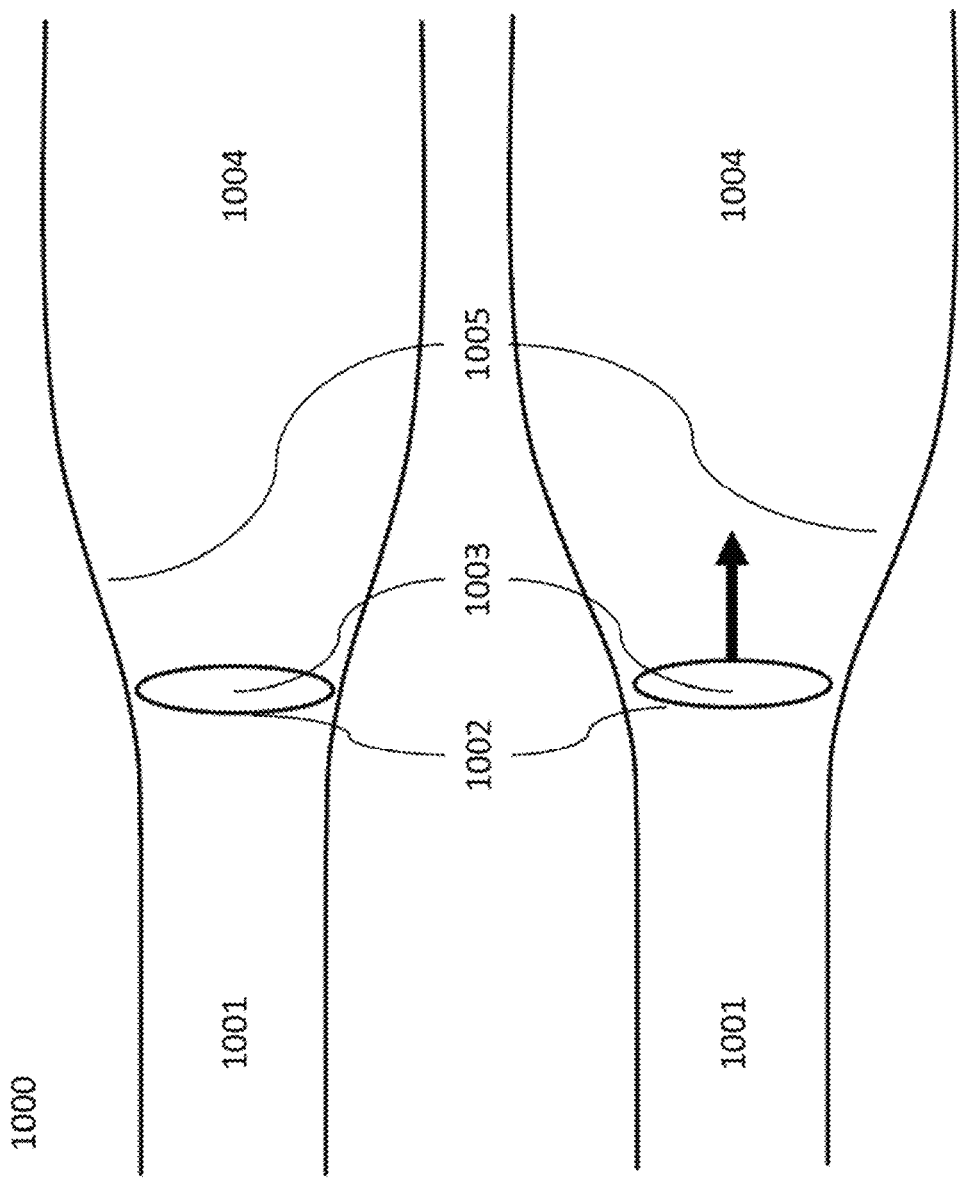
FIG. 10 depicts a fundamental principle of taking advantage of the low pressure in an expanding wake. The disc in the middle represents an obstruction, with air inlet from ambient pressure, wherein the lines indicate the expanding wake.
Figure 11:
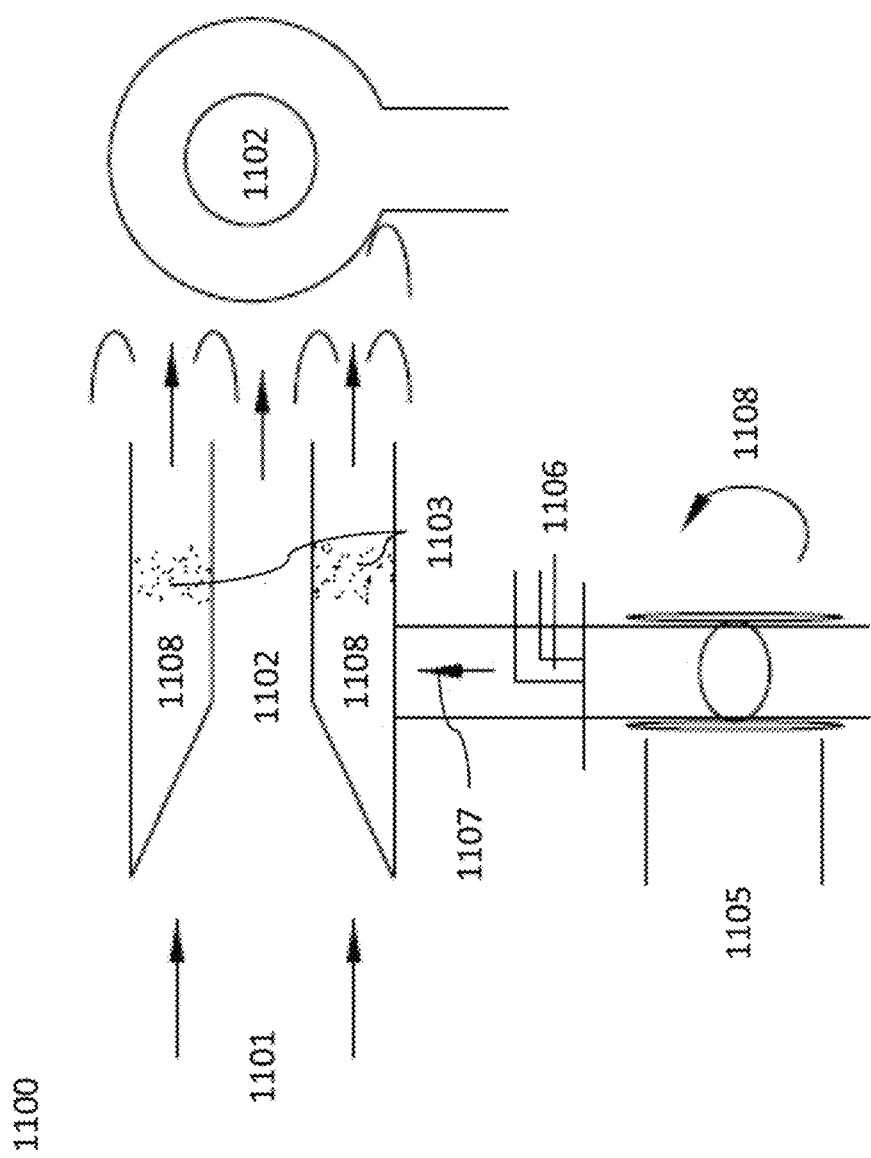
FIG. 11 depicts a radial version (based on entrainment and wake expansion) of the present invention.
Figure 12:
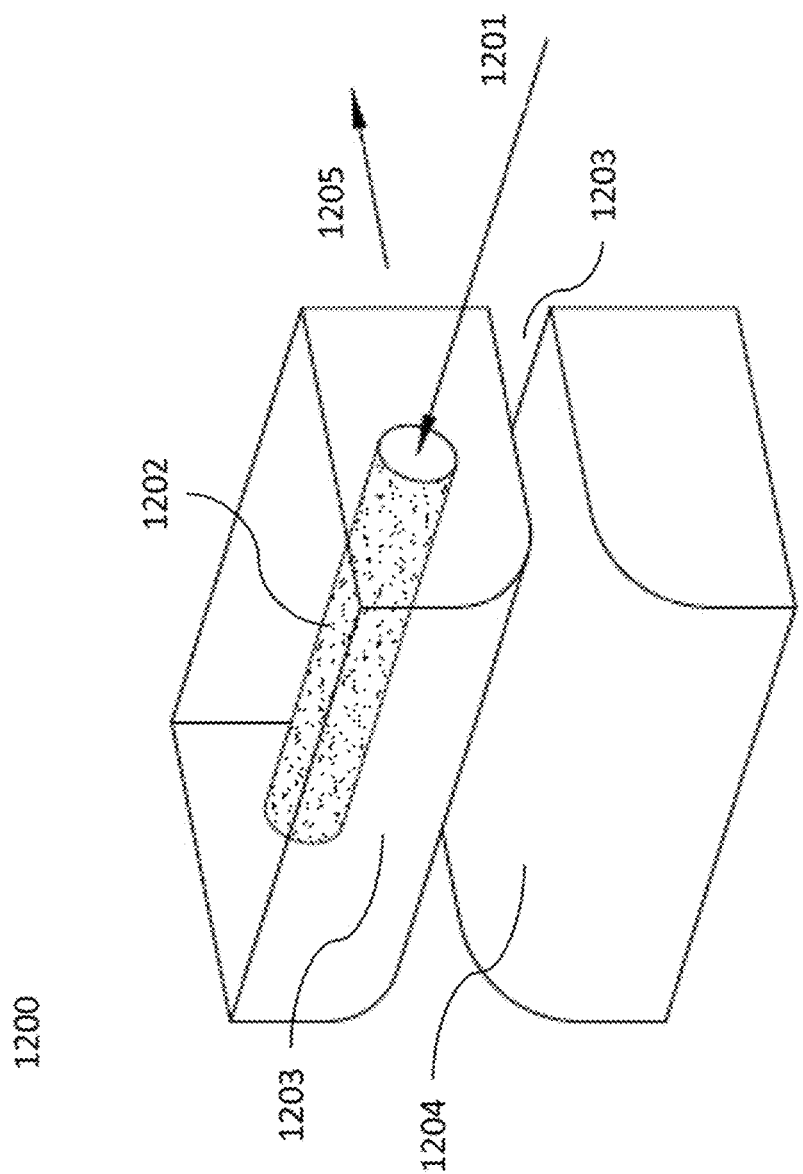
FIG. 12 depicts a linear version of FIG. 11 having mirrored aerodynamic assemblies, wherein an inner plenum is shown.

This principle is exemplified in FIG. 10. The middle ring 1002 has air ejected into the middle of the inner ring 1003, referred to as me. Airflow 1001, may be represented by $m_r=U_\infty*\rho*A$. The outer ring 1005 provides the wake expansion into the expanded ring 1004 ($m_r+m_c$). Other variations of the system of the present invention are shown in FIG. 11 and FIG. 12. In these particular embodiments a perforated internal is implemented to distribute airflow from the internals, the plenum, to the external evenly over the low pressure part of the structure. FIG. 11 provides for a radial expansion approach, where a radial shaped aerodynamic assembly having an inner aperture 1102, wherein airflow 1101 passes into the inner aperture 1102, wherein perforations 1103 are present distributing airflow out of the plenum 1108 and into the aperture, causing the flow of air passing into the intake 1105 and into the channel 1107. An electrical generator 1106 is located within the channel for energy extraction. Additionally, a choke 1108 may be utilized in managing fluid flow in the channel.

FIG. 12 presents an alternative embodiment 1200 having a perforated internal 1202 having a plenum positioned within an upper aerodynamic assembly 1203 and a lower aerodynamic assembly 1204. A gap 1203 allows for fluid flow 1205. The pressure differential as described in the present invention causes the fluid flow into the plenum 1201, into the gap 1203, and outward. Energy extraction means may be dispatched into the plenum of the upper and lower aerodynamic assemblies 1203, 1204.

As discussed herein, there is generally a desire to integrate wind turbine renewables in buildings. Several problems with this persist including vibrations and maintenance in difficult conditions.

The power produced by the suction of the array, can either be used to generate power from one or more generators. However, it would be more prudent to use the suction generated directly as part of the air conditioning system, providing fresh air intake to the building without having to use conversion to electrical systems. In this case, an air duct switch system must be in place to switch between this system and the regular system depending on the wind directions.

Figure 13:
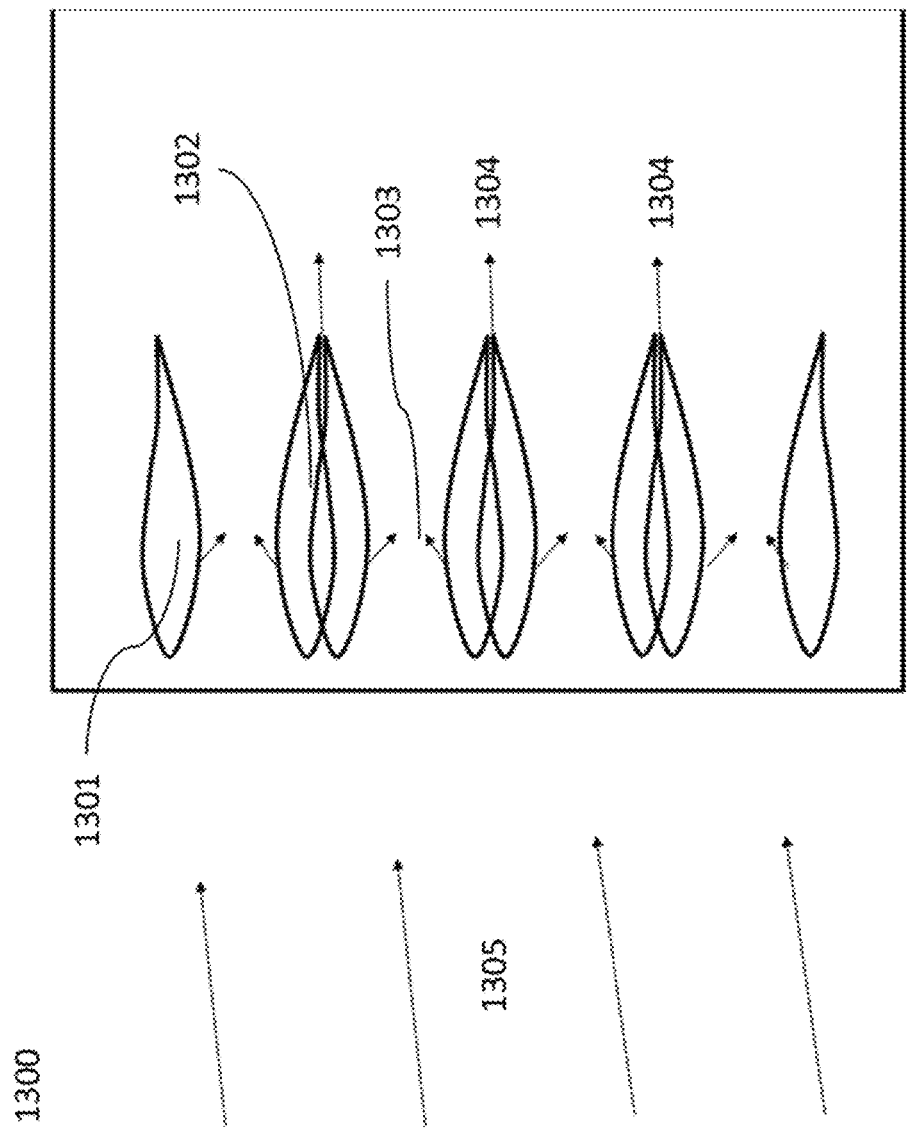
FIG. 13 depicts an embodiment of the present invention having a staggered array of airfoils (left cross section)

FIG. 13 shows a version taking advantage of the present invention and combining multiple elements. One or more airfoils 1301 are presented as an array, allowing for mirrored arrangement as well as a trailing edge assembly 1304. Airflow 1305 passes into the assembly and between the airfoils 1301 to amplify the pressure differential 1303. Further amplification may occur utilizing trailing edge. Fluid flow coming (from left) 1305 with both air jets and trailing edge blowing is used. Fluid is coming into the interior of the blades, sucked up from the base through one or more channels (not shown).

Figure 14:
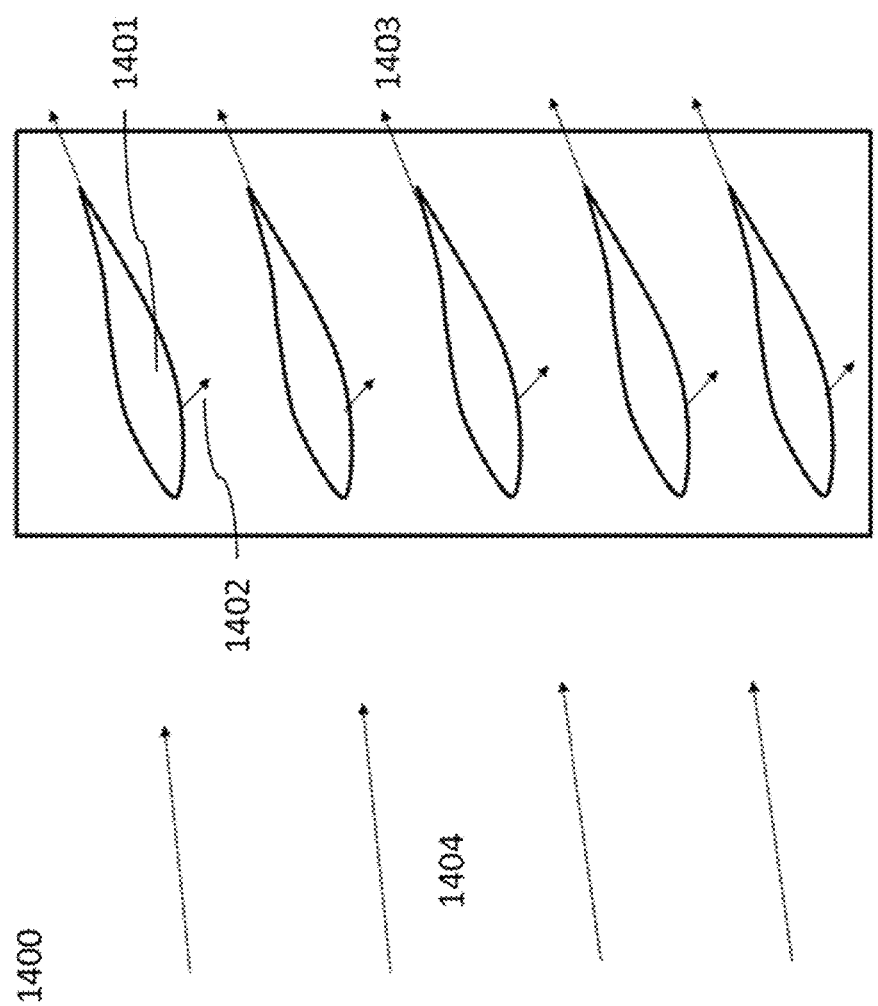
FIG. 14 depicts a cross section of a staggered asymmetrical array of the present invention with accompanying fluid flow.

FIG. 14 presents an exemplary embodiment of an asymmetrical layout of the system of the present invention 1400 having one or more directional airfoils 1401 facing the fluid flow 1404 which utilize two effects: the out of the plenum jetting 1402 and the trailing edge effect 1403 used in combination, increasing the pressure differential.

In certain instances, an array system of the present invention will be more efficient than a single or dual airfoil system. The array can either be symmetrical, as shown in FIG. 13 or asymmetrical as shown in FIG. 14. A significant benefit of this arrangement is that when large clusters are placed in farms, wakes are manipulated not to be straight downstream. Thereby a farm of devices (wind or water) can potentially be optimized.

In another embodiment of the staggered array systems, the airfoils can be rotated around the vertical axis and adjustments to the wind axis can be made. In another embodiment the whole staggered block can be rotated as the two airfoil system shown in FIG. 14.

As discussed with the previous building applications, the skyscraper may simply be replaced with a shallow base to be sunk on the ocean, lake or river floor, so the device can be used as an ocean current energy extraction device. In the water application, the water pumping effect (similar to the air-condition effect) may be much more attractive than the electricity generation application.

The example below provides illustrative embodiments of the present invention. While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

EXAMPLE

Figure 15:
FIG. 15 depicts computational fluid dynamic (CFD) calculation in two dimensions showing airflow between two opposite airfoils and a flow being injected into the stream from the hollow of the airfoils.

Computational fluid dynamics (CFD) results have been used to calculate different configurations. FIG. 15 shows a two dimensional version of such calculation. The airfoils are inserted into a large computational domain in order to avoid blockage, as such would artificially increase the performance of the device in the calculations, such as normally done when investigating energy extraction devices (wind turbines). Flow is injected from the hollow of the airfoils. Different configurations of orifice size, location and airfoil configuration have been investigated using this particular calculation method such as outlined in the technology description.

The results of two configurations is shown in FIG. 16A-B, where the power extracted in Watt-per-meter airfoil and the corresponding power coefficient has been calculated as a function of the pressure differential between the hollow of the airfoils and the ambient pressure. This pressure differential is controlled by the energy extraction and the design of the fan in the system. These two results shows that the system obviously is sensitive to the optimal design combination, bearing in mind only two dimensional calculations have been used for computational efficiency. A full three dimensional calculation or a model construct, would allow the flow from hollow to be swirling and fold up into an air-jet. This is a significant advantage with respect to the performance. FIG. 15 shows CFD calculation in two dimensions showing fluid flow between two opposite airfoils and a flow being injected into this stream from the hollow of the airfoils.

FIG. 16A shows result from CFD calculation of two different variant of that shown in FIG. 15. The y-axis is the power extracted in Watt per meter airfoil from the flow from the hollow of the airfoils as a function of the pressure differential between the hollow and the ambient atmospheric pressure. The pressure differential will be controlled by the energy extraction and essentially the fan design. FIG. 16B shows results from the CFD calculation of the two different variants of that shown in FIG. 15. The y-axis is the power coefficient extracted from the flow such as normally calculated for wind energy extraction devices based on the free stream velocity. The plot shows the sensitivity to configuration of the system to the performance.

The perforations as used herein can be arranged to amplify the system's ability to generate a low pressure; i.e. the more the airflow, the more the ability to enhance the amplification. Perforations, which may be splits, air-jets, nozzles, holes, orifices, and the like enhance the self-amplification effect. Parallel, mirrored airfoils are the most efficient way to further create centerline air pressure and can move them around to change the characteristics of the system described herein.

Those skilled in the art will recognize that the methods and systems of the present invention may be implemented in many manners and as such are not to be limited by the foregoing exemplary embodiments and examples. Furthermore, the embodiments of methods presented and described in this disclosure are provided by way of example in order to provide a more complete understanding of the technology. The disclosed methods are not limited to the operations and logical flow presented herein. Alternative embodiments are contemplated in which the order of the various operations is altered and in which suboperations described as being part of a larger operation are performed independently.

REFERENCES

Gammak, Peter David, Nicolas, Frederic, Simmonds, Kevin John, (Dyson Technology, Ltd.); WO2009030881 (A1)—A Fan, 2009 Mar. 12.

Okabe Masumi, Honjiyou, Shigeru (Tokyo Shibaura Electric Co.) JPS56167897(A)-1981-12-23.
De Lisio, Salvatore, U.S. Pat. No. 2,488,467 (A)-Motor-driven fan, 1949 Nov. 15.
Perdue, R. J., U.S. Pat. No. 2,784,556, Anemo-electric power plants, March 1957.
http://www.ewi.tudelft.nl/en/current/ewicon/
http://sheerwind.com/technology/how☐does☐it☐work
Price, T, J. UK Large-Scale Wind Power Programme From 1970 to 1990:The Carmarthen Bay Experiments and the Musgrove Vertical-Axis Turbines, Wind Engineering, Volume 30, No. 3, 2006.
Oliver, A. G., Wootton, L. R. W., Prats, J., Westergaard, C. H., Voutsinas, S. (1997) Wind turbine blades equipped with Air-jet vortex generators: Full scale verification of blades optimized for increased performance, EWEC, Dublin, October 1997.
Keen, E. B., A Conceptual Design Methodology for Predicting the Aerodynamics of Upper Surface Blowing on Airfoils and Wings, Thesis, Virginia Polytechnic Institute & State University, November 2004
Delafond, F., Problems Concerning Automatic Connection of an Aerogenerator to a Network (translation), Original: United Nations Conference on New Sources of Energy, 1961, Proceedings Solar Energy, Wind Power and Geothermal Energy, Rome, August 21-31, 1961; Vol. 7, Wind Power, pp. 390-394, Translation: National Aeronautics and Space Administration, NASA TT Fl4,873, Washington, D.C. 20546, April 1973.
Hutter, U, Past Developments of Large Wind Generators in Europe, University of Stuttgart, approximately 1968.

What is claimed is:

1. An apparatus for energy extraction from a fluid flow comprising:
   a) an aerodynamic assembly comprising an internal plenum, bounded by a first outer surface and a second outer surface, the first outer surface being solid and the second outer surface comprising one or more elongated perforations in the second outer surface allowing for fluid communication from the plenum to a space at least partially surrounding the aerodynamic assembly;
   b) a channel comprising an inlet and an outlet coupled to the plenum, the channel providing fluid communication between the inlet of the channel and the plenum; and
   c) one or more energy extraction devices in the channel between the inlet and the outlet;
   wherein the one or more elongated perforations are arranged at an angle to a surface normal to create a localized vortex at each of one or more perforation exits, resulting in a reduction in boundary layer thickness across the aerodynamic assembly, and
   wherein an outer surface fluid flow across the outer surfaces of the aerodynamic assembly is operable to cause a negative plenum pressure (Pi) relative to an ambient pressure (Pa) at the inlet of the channel, resulting in a channel fluid flow through the channel and the one or more energy extraction devices into the plenum, and out through the one or more perforations in the second outer surface of the aerodynamic assembly due to a differential pressure between the Pi and the Pa, and wherein the one or more energy extraction devices are positioned to extract energy from the channel fluid flow.

2. The apparatus of claim 1, wherein the aerodynamic assembly is configured to generate lower pressure regions near the one or more perforations than the ambient pressure.

3. The apparatus of claim 1, wherein each of the one or more energy extraction devices is selected from a group consisting of: an electric generator and a hydraulic pump.

4. The apparatus of claim 1, further comprising a motor operable to align the apparatus or parts of the apparatus in response to a direction of the fluid flow.

5. The apparatus of claim 1, wherein the one or more perforations are arranged to amplify the differential pressure between the Pi and the Pa as additional fluid flow exits the one or more perforations.

6. The apparatus of claim 1, wherein the aerodynamic assembly comprises a first aerodynamic assembly, the apparatus further comprising a second aerodynamic assembly wherein the first aerodynamic assembly and the second aerodynamic assembly operably increase centerline pressure and fluid flow velocity to higher than ambient conditions.

7. The apparatus in claim 6, wherein the first outer surface and second outer surface of the second aerodynamic assembly is mirrored from the first aerodynamic assembly to operably increase the centerline pressure and fluid flow velocity are higher than ambient conditions.

8. The apparatus in claim 1 further comprising an actuated choke operable to regulate the maximum power of the fluid flow.

9. The apparatus of claim 1, wherein the aerodynamic assembly is mounted onto a building structure.

10. The apparatus of claim 9, wherein the energy extraction device is mounted at a level below a roof of the building structure and in fluid communication to the plenum of the aerodynamic assembly by the channel.

11. The apparatus of claim 1 wherein the aerodynamic assembly is mounted underwater.

12. The apparatus of claim 1, further comprising ventilation located near a trailing edge of the second surface of the aerodynamic assembly providing fluid communication from the plenum to the space surrounding the aerodynamic assembly and wherein the ventilation is operable in connection with the one or more perforations to generate increased pressure differential (Pi–Pa).

13. A method of extracting energy from a fluid flow comprising:
   a) positioning an aerodynamic assembly comprising an internal plenum bounded by a first outer surface and a second outer surface, the first outer surface being solid and the second outer surface comprising one or more elongated perforations allowing for fluid communication from the plenum to a space at least partially surrounding the aerodynamic assembly; and
   b) flowing fluid through a channel comprising an inlet and an outlet coupled to the plenum and in fluid communication with the inlet of the channel and the plenum and comprising one or more energy extraction devices in the channel between the inlet of the channel and the outlet of the channel;
   wherein the one or more elongated perforations are arranged at an angle to a surface normal to create a localized vortex at each of one or more perforation exits, resulting in a reduction in boundary layer thickness across the aerodynamic assembly, and
   wherein an outer surface fluid flow across the outer surface of the aerodynamic assembly causes a negative plenum pressure (Pi) relative to an ambient pressure (Pa) at the inlet of the channel, resulting in a channel fluid flow through the channel and the one or more energy extraction devices into the plenum, and out through the one or more perforations in the second outer surface of the aerodynamic assembly due to a differential pressure between the Pi and the ambient pressure (Pa), and wherein the one or more energy extraction devices are positioned to extract energy from the channel fluid flow.

14. The method of claim 13, further comprising arranging the aerodynamic assembly to generate lower pressure regions near the one or more perforations than the ambient pressure.

15. The method of claim 13, further comprising extracting energy from the channel fluid flow by the one or more energy extraction devices selected from a group consisting of an electric generator and a hydraulic pump.

16. The method of claim 13, further comprising aligning the aerodynamic assembly in response to a direction of the fluid flow.

17. The method of claim 13, further comprising arranging the one or more perforations to amplify the differential pressure between the Pi and the Pa as additional fluid flow exits the one or more perforations.

18. The method of claim 13, wherein the aerodynamic assembly comprises a first aerodynamic assembly, and the method further comprises arranging a second aerodynamic assembly wherein the first aerodynamic assembly and the second aerodynamic assembly are mirrored to increase centerline pressure and airflow fluid flow velocity higher than ambient conditions.

19. The method of claim 13 further comprising choking the channel fluid flow velocity to regulate the maximum power of the fluid flow.

20. The method of claim 13, further comprising mounting the aerodynamic assembly onto a roof of a building structure.

21. The method of claim 13, further comprising mounting the aerodynamic assembly underwater.

* * * * *